United States Patent
Gerszberg et al.

[11] Patent Number: 5,949,474
[45] Date of Patent: Sep. 7, 1999

[54] VIDEOPHONE BLOCKER

[75] Inventors: Irwin Gerszberg, Kendall Park; Jeffrey S. Martin, Dover; Hopeton S. Walker, Haledon, all of N.J.

[73] Assignee: AT&T Corp, Middletown, N.J.

[21] Appl. No.: 09/001,353

[22] Filed: Dec. 31, 1997

[51] Int. Cl.⁶ ............................ H04N 7/12
[52] U.S. Cl. .................. 348/14; 379/110.01
[58] Field of Search ............. 348/14–20; 379/110.01, 379/93.17

[56] References Cited

U.S. PATENT DOCUMENTS

| | | |
|---|---|---|
| 4,456,925 | 6/1984 | Skerlos et al. . |
| 4,620,289 | 10/1986 | Chauvel . |
| 4,715,059 | 12/1987 | Cooper-Hart et al. ............ 348/20 |
| 4,725,694 | 2/1988 | Auer et al. . |
| 4,881,253 | 11/1989 | Takeuchi et al. ............... 348/14 |
| 4,916,441 | 4/1990 | Gombrich . |
| 4,932,047 | 6/1990 | Emmons et al. ............... 348/14 |
| 5,014,267 | 5/1991 | Tompkins et al. . |
| 5,157,717 | 10/1992 | Hitchcock . |
| 5,335,276 | 8/1994 | Thompson et al. . |
| 5,393,964 | 2/1995 | Hamilton et al. . |
| 5,406,615 | 4/1995 | Miller, II et al. . |
| 5,488,412 | 1/1996 | Majeti et al. . |
| 5,512,935 | 4/1996 | Majeti et al. . |
| 5,534,913 | 7/1996 | Majeti et al. . |
| 5,546,316 | 8/1996 | Buckley et al. . |
| 5,561,604 | 10/1996 | Buckley et al. . |
| 5,572,005 | 11/1996 | Hamilton et al. . |
| 5,583,965 | 12/1996 | Douma et al. . |
| 5,584,054 | 12/1996 | Tyneski et al. . |
| 5,587,735 | 12/1996 | Ishida et al. . |
| 5,612,733 | 3/1997 | Flohr ............................ 348/14 |
| 5,619,684 | 4/1997 | Goodwin et al. . |
| 5,644,628 | 7/1997 | Schwarzer et al. . |
| 5,657,246 | 8/1997 | Hogan et al. ................ 348/14 |
| 5,671,267 | 9/1997 | August et al. . |
| 5,682,195 | 10/1997 | Hendricks et al. . |
| 5,684,918 | 11/1997 | Abecassis . |
| 5,734,414 | 3/1998 | Nishimura et al. ............ 348/14 |
| 5,793,367 | 8/1998 | Taguchi ....................... 348/15 |

FOREIGN PATENT DOCUMENTS

| | | |
|---|---|---|
| 6-121305 | 4/1994 | Japan . |
| 7-135591 | 5/1995 | Japan . |

*Primary Examiner*—Wing F. Chan

[57] ABSTRACT

A videophone with selective privacy control of a caller's transmitted image. The videophone has a shutter in front of the lens, and an actuator for moving the shutter to selectively cover or uncover the lens at the option of the local caller. A video indicator also may be included, which separately indicates that the shutter is open. The video indicator (which may be an LED) may be located adjacent the lens so that it is visible when the shutter is open, and is covered by the shutter when the shutter is closed. Alternatively, the videophone makes use of a visual signal (such as an icon) which is displayed when the shutter is closed, separately or in combination with a video indicator which indicates that the shutter is open.

10 Claims, 14 Drawing Sheets

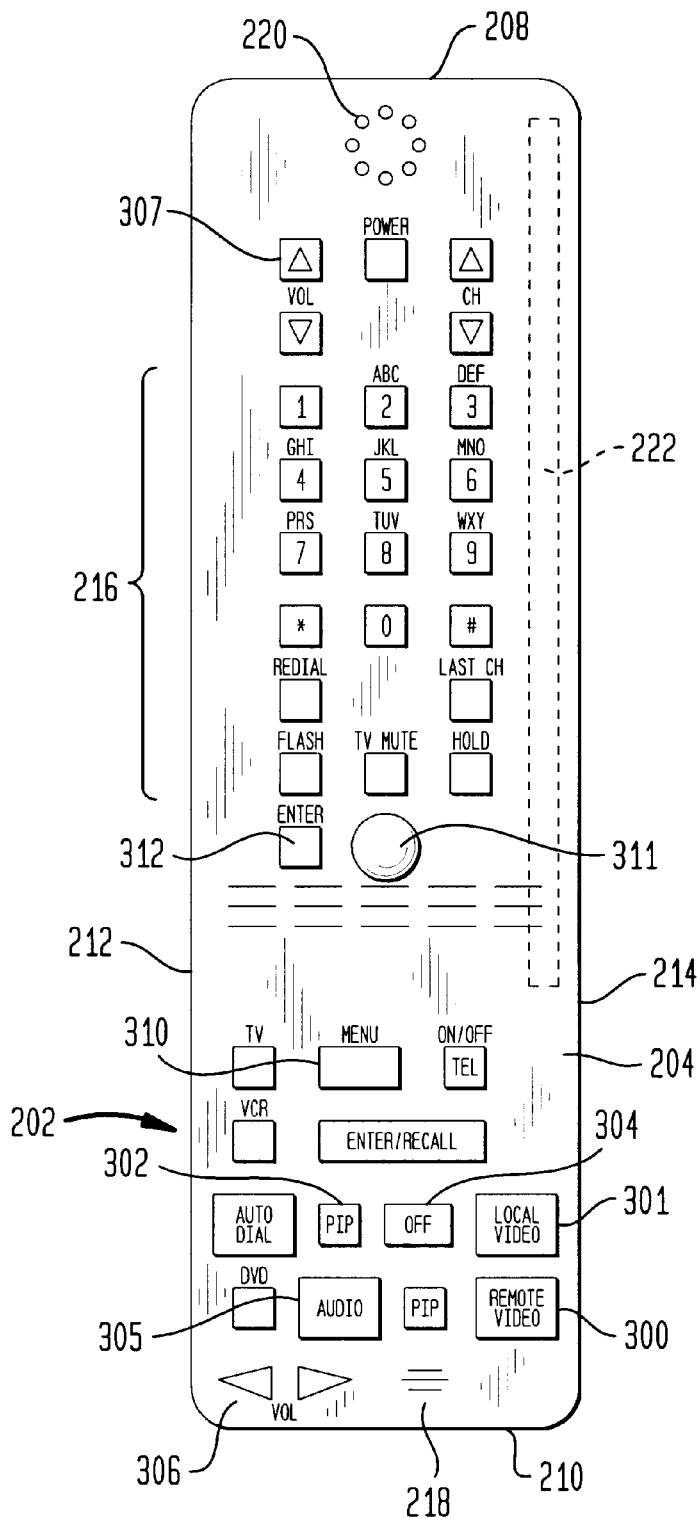
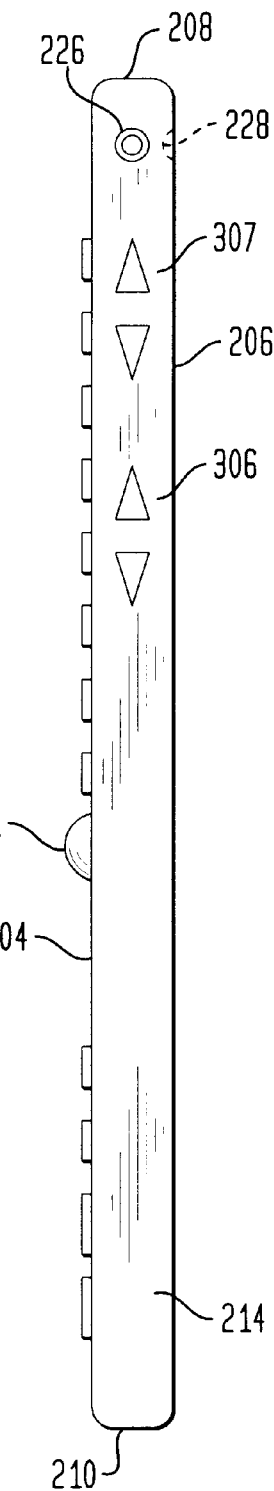

VIDEOPHONE BLOCKER

TECHNICAL FIELD

This invention relates to videophones and, more particularly, to control of the camera component of a videophone.

BACKGROUND

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the type of DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs and/or desired quality levels. Thus, it is difficult for the interexchange companies to convince potential customers to switch to their equipment or to use their services. These factors ensure the continued market presence of the local telephone company. As part of this system, there is a need for improved architectures, services and equipment utilized to distinguish the interexchange companies' products and services.

The increasing use of videophones as a means of conducting telephone calls has added a new dimension of openness to telecommunication, often with unwanted consequences. There may be circumstances where the party being called feels as though his privacy is being invaded by visual exposure to the remote caller (and to others on the line in the case of a conference call) through an electronic "widow" to his private domain. Sometimes a party to a call may wish to be invisible to others on the line during part of the call, with positive assurance that he cannot be seen. Existing videophones do not afford a caller a desired degree of visual privacy while engaged in a telephone call. This invention addresses the need for selective and assured privacy in all types of videophones, be they stand-alone units or those which are integrated into a video component system.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a videophone and/or other devices to provide new services to an end user; an intelligent services director (ISD) disposed near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network. The videophone may be a stand-alone unit, or integrated into a video component system that may be under ISD control.

As part of this system, the invention provides a videophone having a shutter in front of the lens, and an actuator for moving the shutter to selectively cover or uncover the lens at the option of the local caller. A video indicator also may be included, which separately indicates that the shutter is open. The video indicator (which may be an LED) may be located adjacent the lens so that it is visible when the shutter is open, and is covered by the shutter when the shutter is closed.

In another embodiment, the invention provides a videophone having a shutter and an actuator as described, and a visual signal (such as an icon) which is displayed when the shutter is closed. A video indicator also may be included, which separately indicates that the shutter is open.

BRIEF DESCRIPTION OF THE DRAWING

The foregoing summary of the invention, as well as the following detailed description of preferred embodiments, is better understood when read in conjunction with the accompanying drawing figures, which are included by way of example, and not by way of limitation with regard to the claimed invention.

FIG. 6 is a front view of the front face of the handset of FIG. 5.

FIG. 8 is an elevational view of the right side of the handset of FIG. 5.

DETAILED DESCRIPTION

Figure 1:
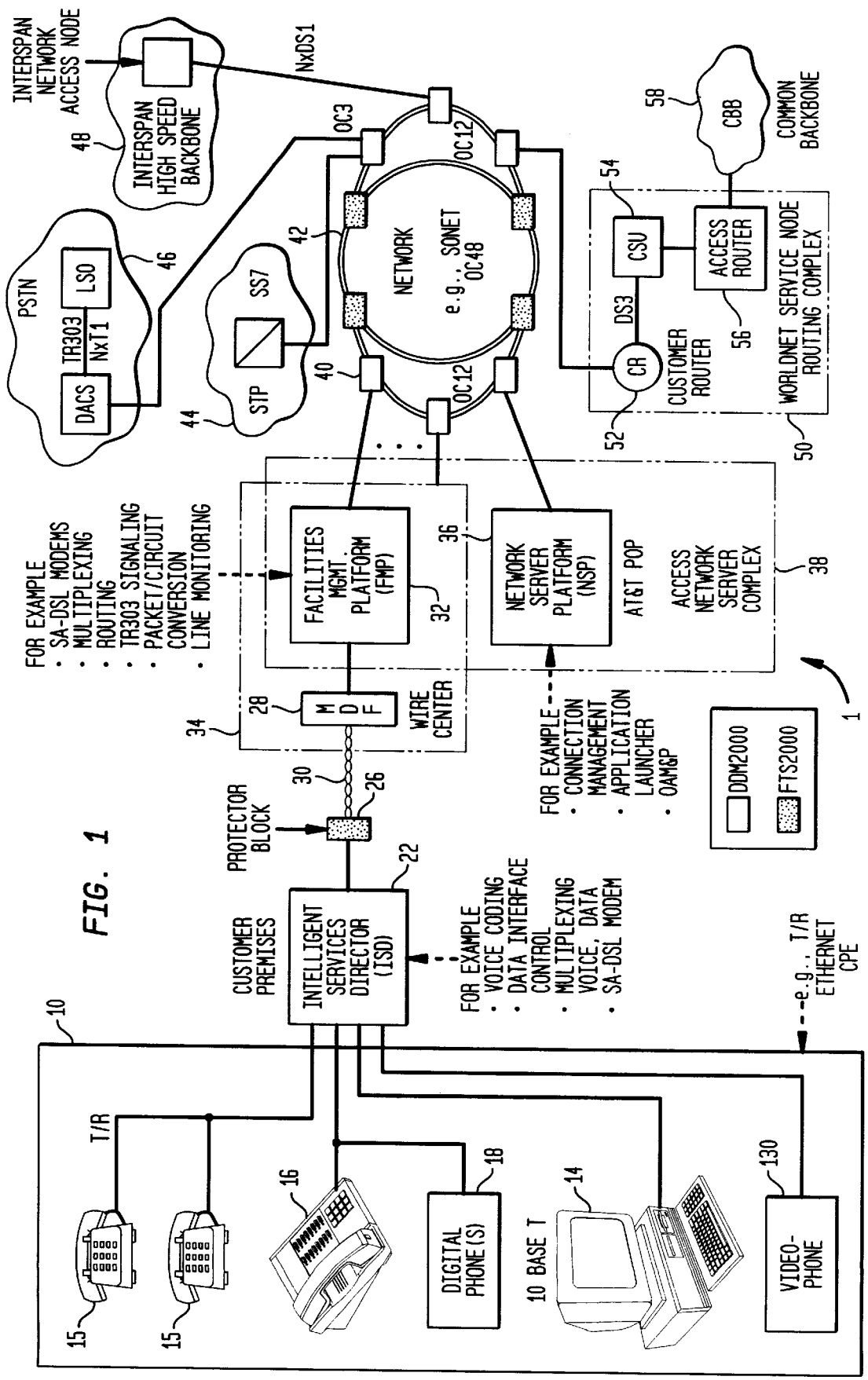
FIG. 1 illustrates an embodiment of a hybrid fiber twisted pair local loop architecture.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment. Additionally the service provider may collect fees from advertisers to subsidize the cost of the equipment.

Figure 2:
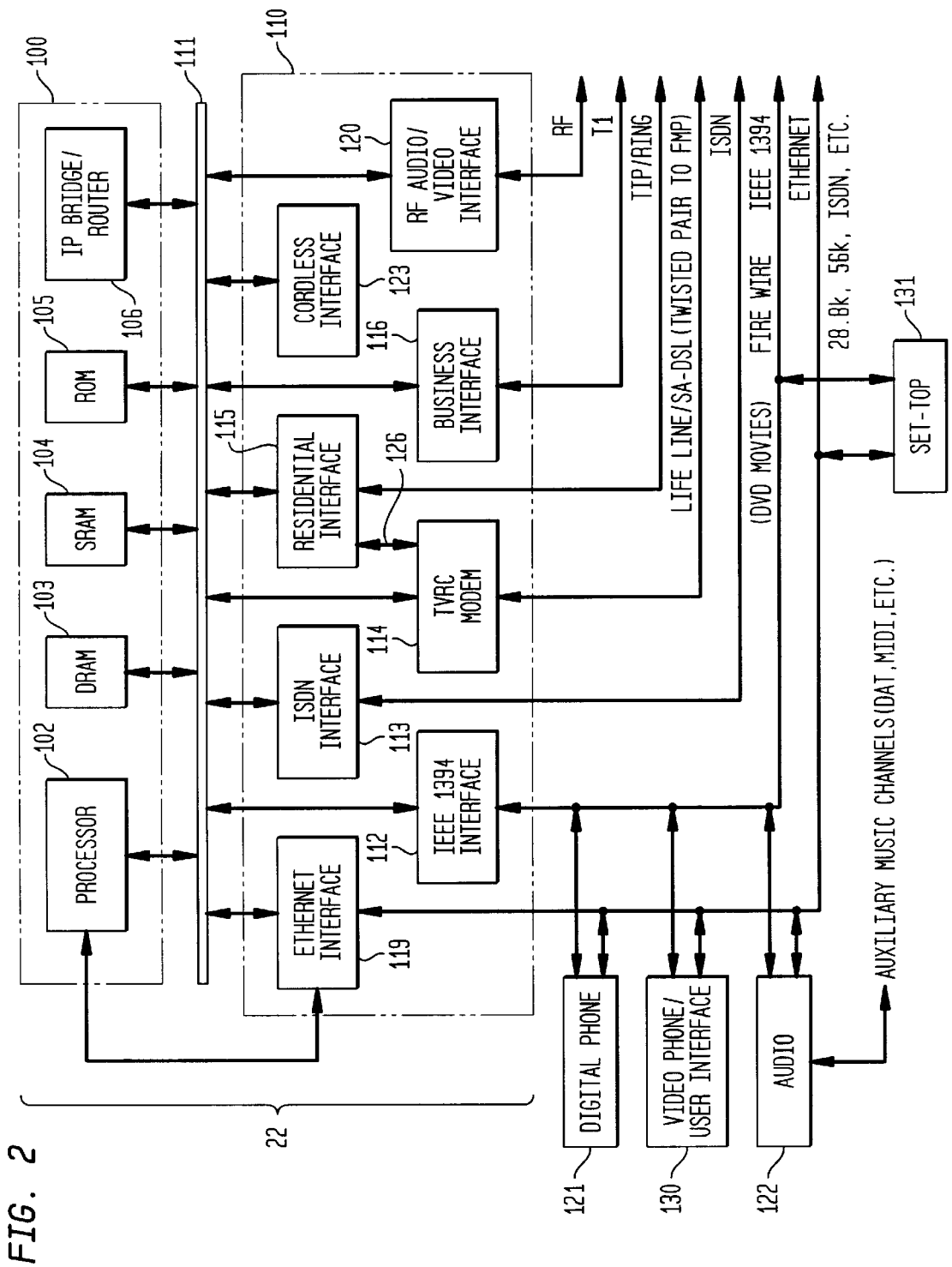
FIG. 2 is a block diagram of an embodiment of an intelligent services director consistent with the architecture shown in FIG. 1.

Referring to FIG. 2, the ISD 22 may connect with a variety of devices including analog and digital voice telephones 15, 18; digital videophones 130, devices for monitoring home security, meter reading devices (not shown), utilities devices/energy management facilities (not shown), facsimile devices 16, personal computers 14, and/or other digital or analog devices. Some or all of these devices may be connected with the ISD 22 via any suitable mechanism such as a single and/or multiple twisted-pair wires, fiber, and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, an SRAM 104, a ROM 105 and/or an internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an Ethernet interface 119 (e.g., 10 BaseT, 100 BaseT, etc.), an IEEE 1394 "fire wire" interface 112 (e.g., for a digital videodisc device (DVD)), a digital subscriber line (DSL) modem (e.g., a TVRC modem, 114), a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, videophone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the videophone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the videophone/user interface 130, digital phones, 121 and/or another suitable device such as a set-top device 131.

In further embodiments, the ISD 22 may be configured as an IP proxy server such that each of the devices connected to the server utilizes transmission control protocol/internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set-top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/movie in real time for immediate viewing and/or into storage for later viewing.

Figure 3A:
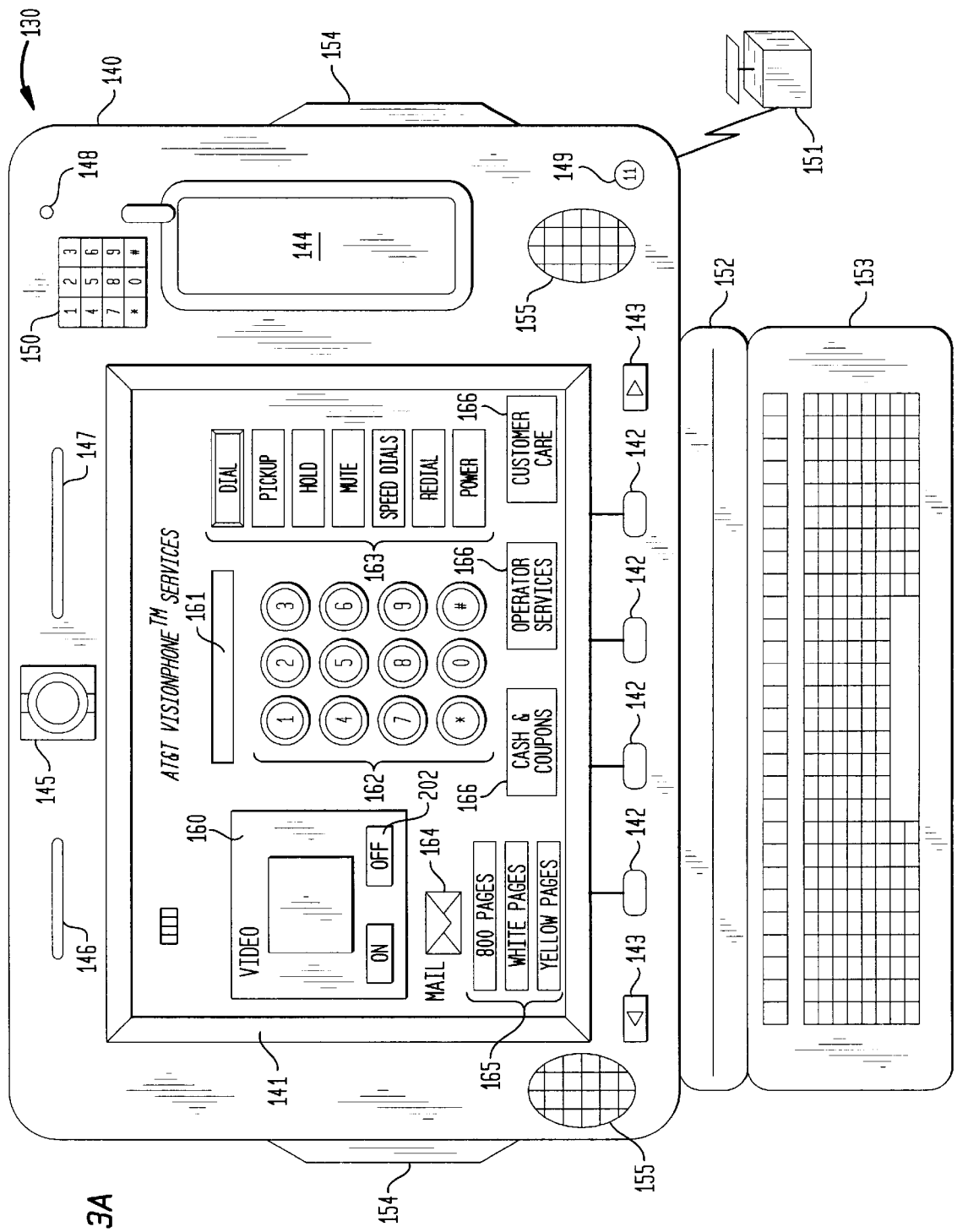
FIGS. 3A and 3B illustrate an embodiment of a videophone consistent with the architecture shown in FIG. 1.
Figure 3B:
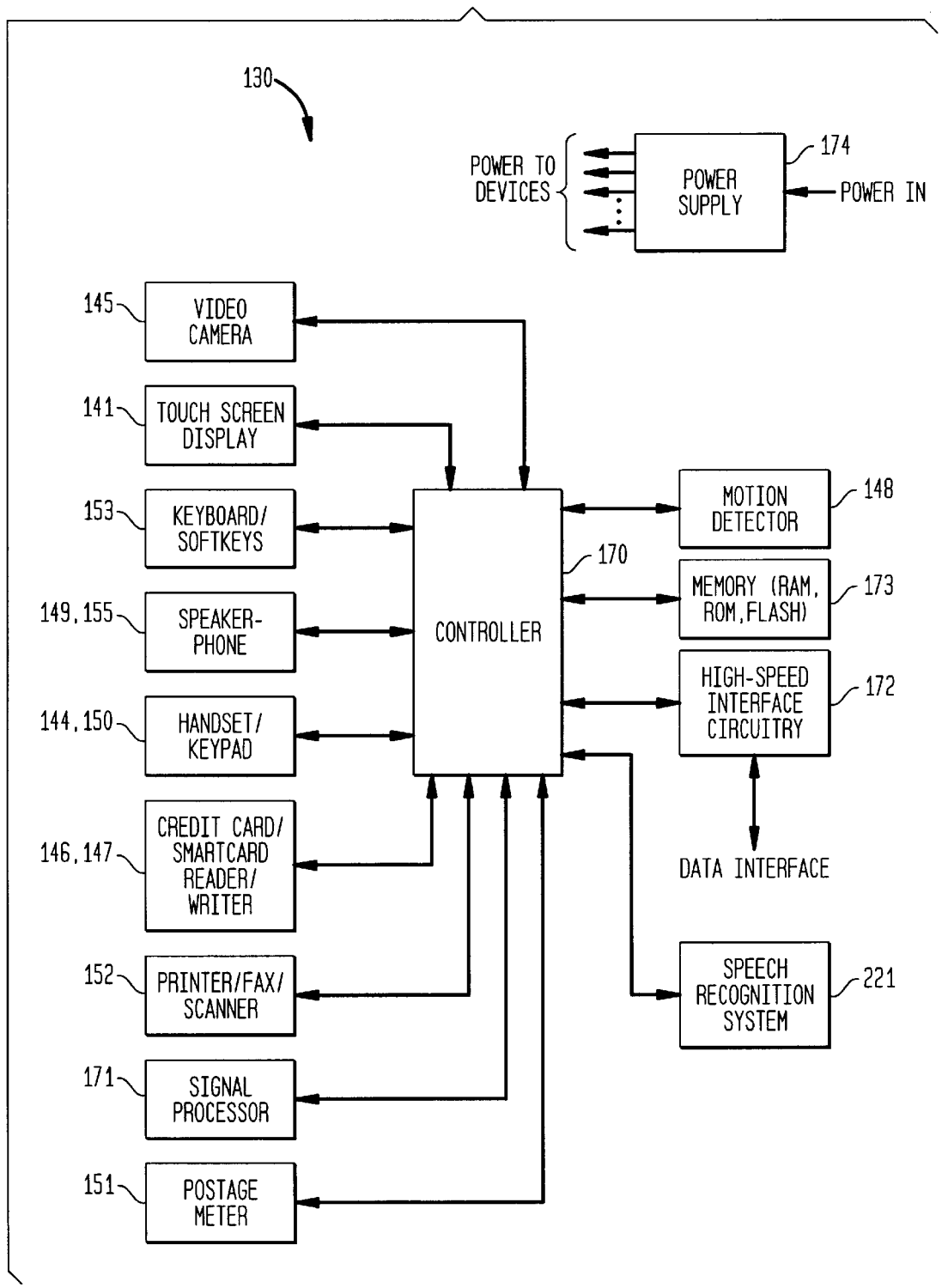

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the videophone unit is shown in FIG. 3B. Referring to FIG. 3B, in addition to the items above, the videophone 130 may also include a signal processor 171, high speed interface circuitry 172, memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the videophone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the videophone in accordance with one or more of the applications incorporated by reference below.

Figure 4A:
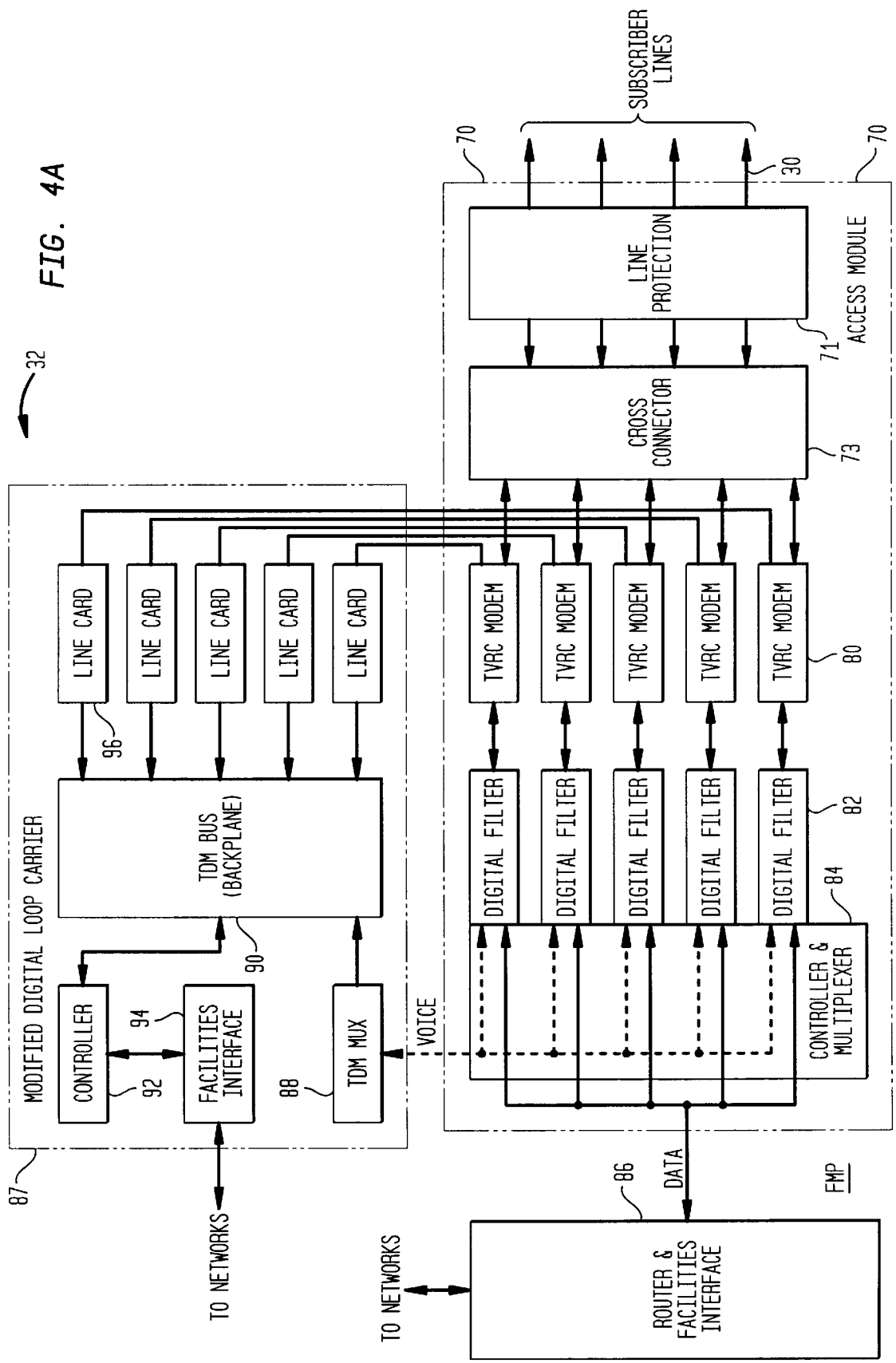
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexor (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
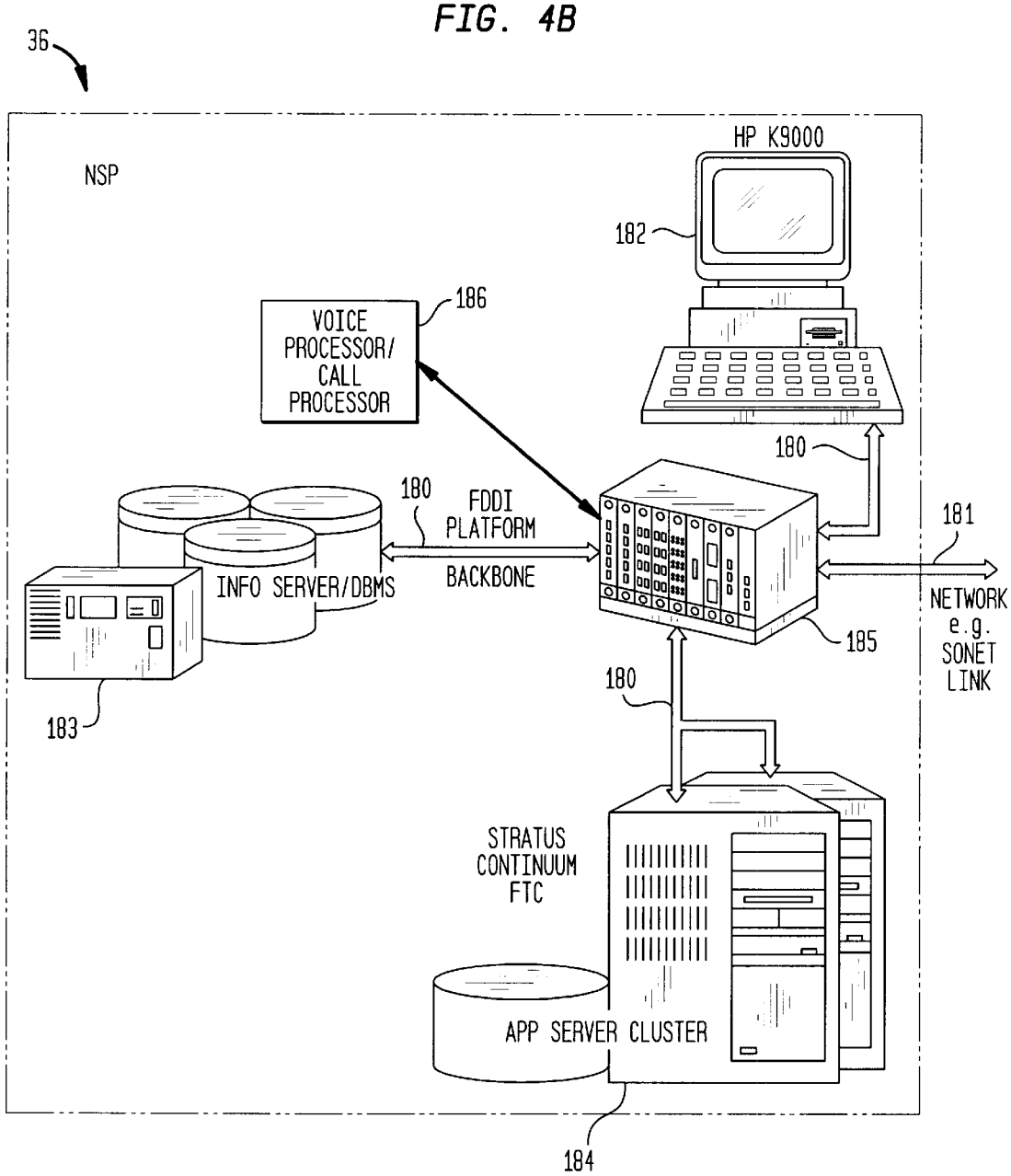
FIG. 4B illustrates a block diagram of an embodiment of a network server platform consistent with the architecture shown in FIG. 1.
Figure 5:
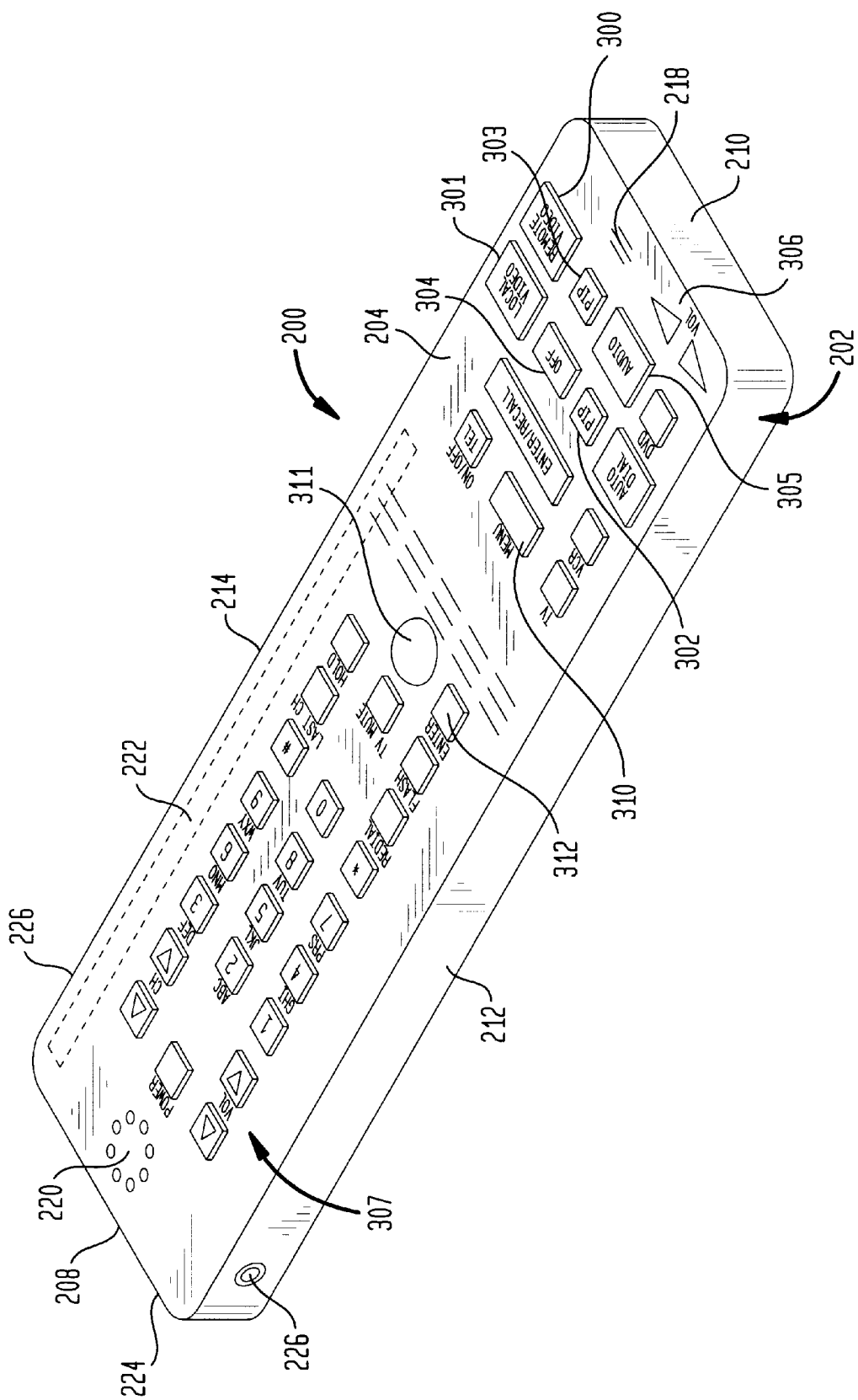
FIG. 5 is a perspective view of a remote control handset for controlling a video receiver and performing other functions.
Figure 7:
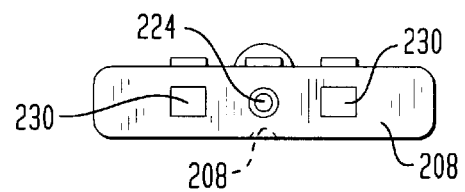
FIG. 7 is an elevational view of the top end of the handset of FIG. 5.
Figure 9:
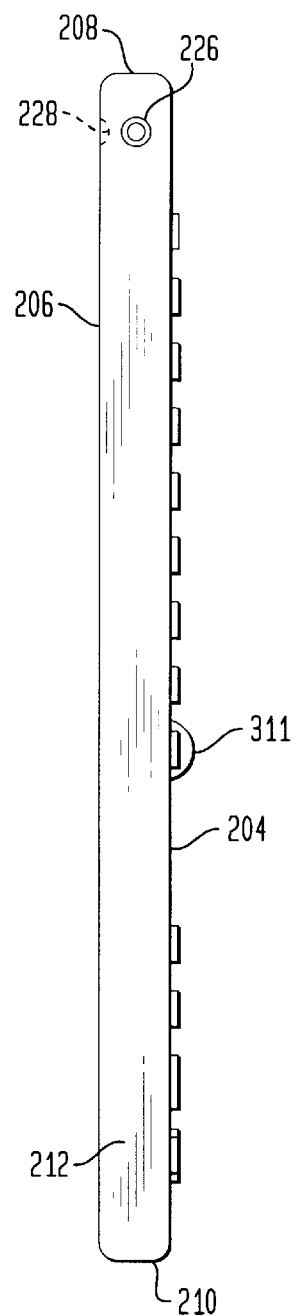
FIG. 9 is an elevational view of the left side of the handset of FIG. 5.
Figure 10:
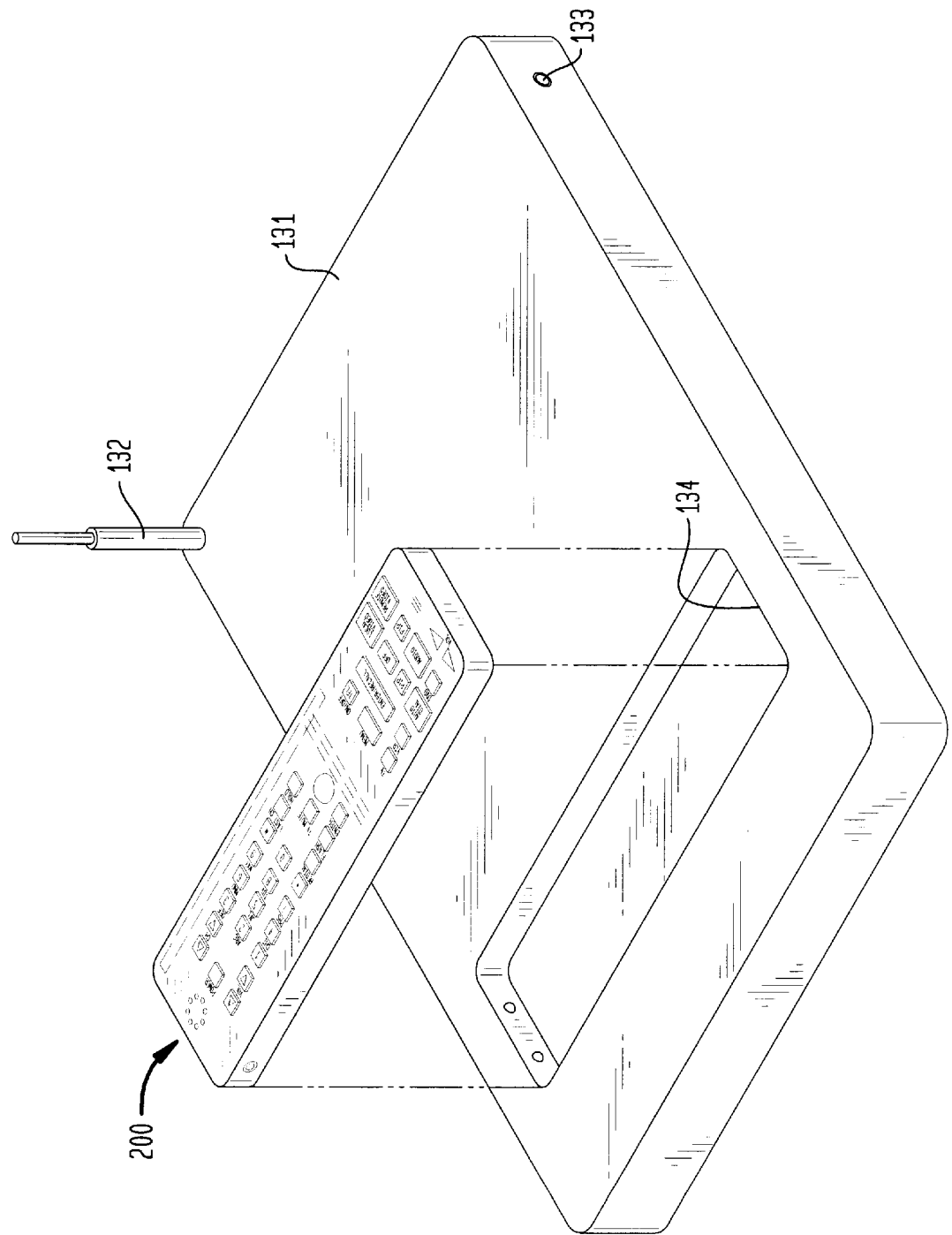
FIG. 10 is a perspective view of a set-top control unit showing how the handset fits into a recharging cradle therein.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

FIGS. 5–10 depict a remote control handset 200 which interacts with a television set-top device 131. Set-top device 131 typically is a controller for a television set on which it sits. It could, however, be located next to the television set; or control another video appliance, such as a VCR; or be incorporated into the video appliance which it controls, such as a video receiver.

Handset 200 has a case 202 which houses the electronics that enable the handset to communicate with set-top device 131. Case 202 has a front face 204, a rear face 206, a top end 208, a bottom end 210, a left side 212, and a right side 214.

Front face 204 has a user interface comprising control keys for activating various functions. For example, front face 204 has a standard alphanumeric telephone keypad 216 and ancillary cordless telephone function keys, such as REDIAL, AUTO DIAL, FLASH, HOLD and telephone ON/OFF keys. The alphanumeric keypad 216 also controls video/audio functions in conjunction with ancillary video/audio function keys, such as POWER, volume (VOL ↕), channel (CH↕), last channel swap (LAST CH), and TV MUTE. Other keys select the device to be controlled, such as TV, VCR, and DVD. Additional keys (MENU, ENTER/RECALL, REMOTE VIDEO, AUDIO, LOCAL VIDEO, PIP, OFF) activate certain on-screen programming, adjustment and control functions for telephone usage, video viewing, etc. Also on front face 204 are openings for a microphone 218 and a loudspeaker 220 which enable the handset to function as a telephone with the loudspeaker held to the user's ear and the microphone adjacent the user's mouth. The weight of the handset preferably is more or less evenly distributed so that it feels balanced and is comfortable to hold when used as a telephone or as a remote control.

Several of the keys on the handset provide, in conjunction with appropriate software, unique control of the incoming and outgoing (local) video components of a telephone call. For example, the videophone MENU key 310 may place on an associated TV screen (not shown) any of the videophone menus contained in the applications incorporated by reference below. The user may select functions using the track ball 311 and the ENTER key 312. Phone services accessed by the phone menus may include caller ID, speed dials, etc. The REMOTE VIDEO key 300 displays/removes the remote caller's video image on the television screen, while the LOCAL VIDEO key 301 displays/removes the local caller's video image on the television screen. Further, PIP keys 302, 303 for the remote and local video images enable the local caller to view himself, the remote caller or both, or even display one or both callers along with video programming from another source such as the set-top device 131. An OFF key 304 electronically disables and/or mechanically shutters the local caller's video camera (which may be located, e.g., on top of the television set) so that the local caller can decide whether he should be seen by the remote caller. Further, the AUDIO key 305 is associated with the remote caller and allows the local caller to direct the audio portion of the remote caller's signal either to the handset loudspeaker 220 or to the television set for amplification and broadcast over the television or remote speakers. Where the audio is broadcast over the television speaker, the phone audio volume may be controlled via phone volume controls 306. Thus, the phone audio may be overlayed over the TV audio output with the relative volume or muting of each controlled separately. By using the TV loudspeakers instead of the speaker in the remote control, the battery life in the remote control is conserved. Additionally, the TV volume control 307 and the phone volume control 306 may be located on the side of the phone (FIG. 8) to allow adjustment of the relative volume of the TV and/or phone audio while talking on the phone. Where surround sound is available, the audio from the phone could be made to come from a different location such as behind the viewer whereas video sound is in front of viewer.

During use as a telephone, voice and DTMF tone communication through set-top device 131 and/or ISD 22 may be accomplished via a radio frequency link, preferably at a frequency of 900 MHz., by means of an antenna 132 on set-top device 131 and/or cordless interface 123 on the ISD 22, and an antenna 222 which may be completely concealed within case 202. Antenna 222 is located along one side of case 202, and the electronic components within the case are appropriately shielded by a metal clam-shell structure (not shown) to prevent unwanted interference from the radio frequency transmissions. Although it is preferred to completely conceal antenna 222 within case 202, a partially concealed antenna, or an external antenna, could be used instead. Where an external antenna is used, it is desirable to have multiple infrared diode (IRD) ports to prevent the external antenna from interfering with a single IRD port.

While all communication functions could be effected via the radio frequency link or an infrared link, it is preferred that audio/video control and commands be communicated through the infrared link while audio communications and/or commands are carried out via the antenna. Set-top device 131 has an infrared detector 133 on the front of its base which receives infrared signals from any of four infrared emitting diodes 224, 226, 228 on handset 200. These diodes preferably have broad beams and together afford maximum infrared coverage for a hand-held remote control device. The diodes may be located on one, two, three, or four faces at and near the top end of case 202 so they will not be rendered inoperative by being covered by the user's hand, which normally engages the lower half of the handset, or as the user turns.

Conventionally located on the top end 208 of case 202 is an infrared emitting diode 224. When the top of handset 200 is aimed generally at set-top device 131, infrared signals emitted by diode 224 are received by detector 133.

For added versatility and convenience, an infrared emitting diode 226 is located on each side of case 202. Signals emitted by one of these side-mounted diodes are received by detector 133 when the user holds the handset with one side generally facing the set-top device 131, such as when the user is holding the handset to his ear during a telephone conversation, generally facing the television set where the remote caller's video signal may be displayed, and wishes to adjust a video function. Having a diode on each side of the handset insures infrared communication regardless of which ear is placed adjacent loudspeaker 220. Thus, volume may be adjusted while the user speaks on the phone. One of the side-mounted diodes 226 also may come into play when the handset is held more or less horizontal but the user turns away from the television set while depressing a command key.

Further, an additional infrared emitting diode 228 is located on the rear face 206 of case 202. Signals from this rear-mounted diode are received when the rear of the handset is held generally facing the set-top device 131. This would occur when the user turns his head away from the television set while holding the handset to his ear. It also allows the handset to function when it is held up by the user for easy viewing of the controls on the front face 204.

Handset 200 preferably is powered by a rechargeable battery (not shown). The battery may be recharged when the handset is not in use by placing it in a mating recharging cradle 134 in set-top device 131. Recharging cradle 134 has a pair of hot contacts 135 which mate with contacts 230 on the top end 208 of case 202. Conventional circuitry in set-top device 131 prevents overcharging of the battery. If the set-top device is integrated into the video appliance which it controls, such as a video receiver, a similar recharging cradle could be provided on the top or the side of the appliance housing. Alternatively, or in addition, a remote recharging cradle powered by line current could provide a more convenient charging location for the handset when not in use.

Figure 11:
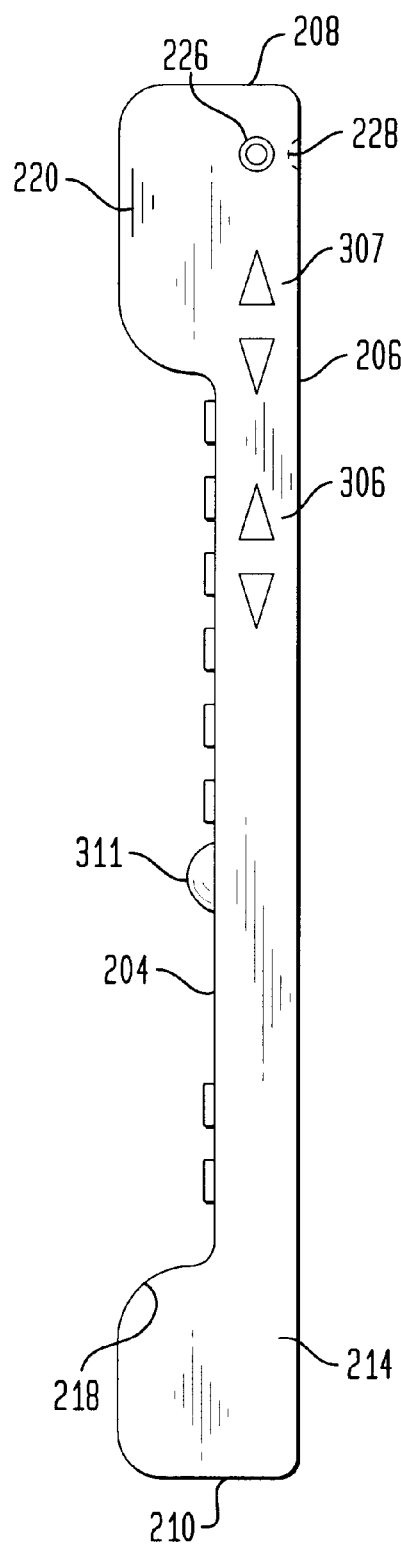
FIG. 11 is a side view of another embodiment of the handset.

Although handset 200 is illustrated as generally flat and rectangular in shape, it may take any form as long as it is convenient and comfortable to use as described. The handset could, for example, be ergonomically contoured to more closely fit the hand and the side of the head, e.g. with a curved dumbbell face as shown in FIG. 11.

Figure 12:
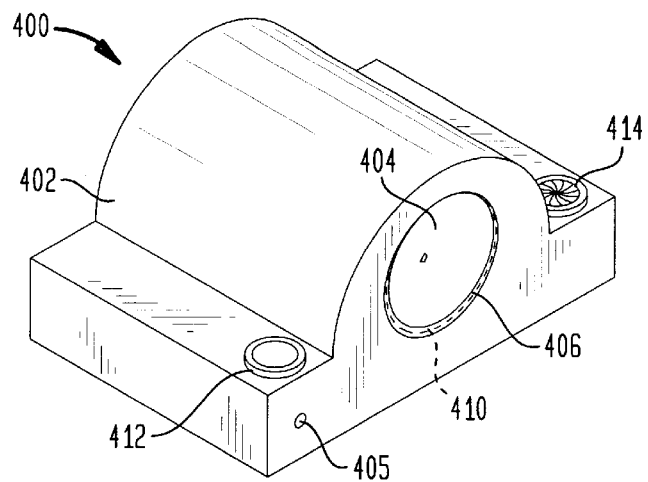
FIG. 12 is a perspective view of a set-top video camera with privacy features according to the invention.
Figure 13:
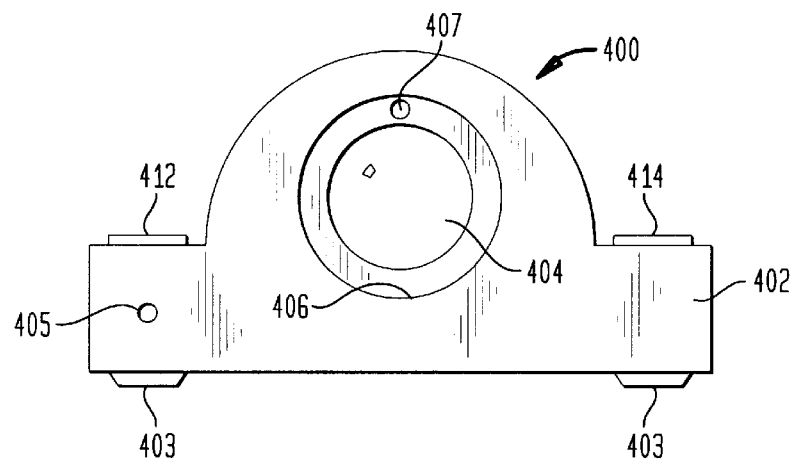
FIG. 13 is a front elevational view of the camera of FIG. 12 in the open state.
Figure 14:
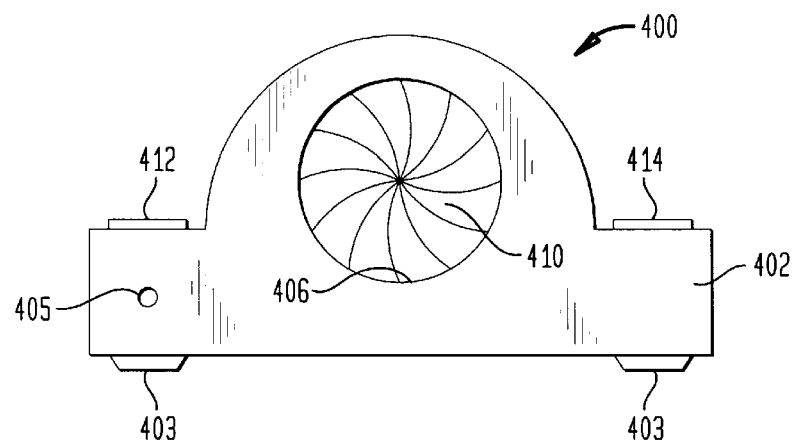
FIG. 14 is a front elevational view of the camera of FIG. 12 in the closed state.

In an integrated remote control videophone system such as that described above, a video camera typically would be located above the video display (i.e., a set-top camera) so that the local caller, who normally would face his video display while speaking, would appear to be facing the remote caller on his video display. A preferred embodiment of such a camera is illustrated in FIGS. 12–14.

Camera 400 comprises a housing 402, supported on four feet 403, in which a lens 404 and associated electronics are mounted. Lens 404 gathers light through a window 406 and, in conventional fashion, focuses the image on a CCD image sensor or the like, which converts the optical image to an electronic video signal representative of the optical image. The video signal is fed via a cable or wireless link (not shown) to the video electronics (which may be housed in set-top device 131) which integrate the signal into a composite voice/video telephone signal. An IN USE indicator 405, such as a green LED, is located on the front of housing 402 and continuously glows during a telephone call to inform the local caller that the call is in progress. A video indicator 407, such as a red LED, is located above lens 404 in the annular space between the lens and the edge of window 406. Video indicator 407 also continuously glows during the call.

Window 406 can be closed by a leaf shutter 410 (FIG. 14) which is located in front of lens 404. When closed, shutter 410 blocks the entry of light into lens 404, and obscures video indicator 407 from view. When open, shutter 410 is completely retracted into housing 402 (FIGS. 12, 13) to uncover lens 404 and video indicator 407.

Shutter 410 is typical of known shutters used in the optical field. It is actuated by a conventional servomotor via the OFF key 304 on handset 200. Additional shutter control keys 412 (OPEN) and 414 (CLOSE) may be provided on the base of housing 402. A lever-actuated mechanical override linkage (not shown) also may be provided for actuating the shutter in the event the servomotor or the remote control link should fail.

The above described arrangement readily meets the objective of providing assured visual privacy during a videophone call. Even if the party desiring visual privacy were able to electronically turn off the camera component of his videophone at will, a degree of uncertainty still would remain without the ability to physically shutter the camera lens. The ability to see the closed shutter, especially if it is highly visible (as might be afforded by a bright color and/or a highly noticeable pattern), affords ample feedback and assurance to the local caller. The video indicator, which is visible whenever the shutter is open, serves as a reminder to the local caller that he can be seen by the remote caller, and will prompt him to shutter the camera if video privacy is desired.

Although a domed housing is shown, it will be apparent that the housing may take any desired shape as long as it is able to house the operative components and allow them to operate as described above. Further, any other type of mechanism may be used to shutter the lens, including but not limited to one or two horizontally sliding panels, one or two vertically sliding shades, a sliding curtain, a pivoted disk, a hinged door, etc. Further, the inventive concept is applicable to any type of videophone, including stand-alone units as well as those which utilize separately housed components.

Figure 15:
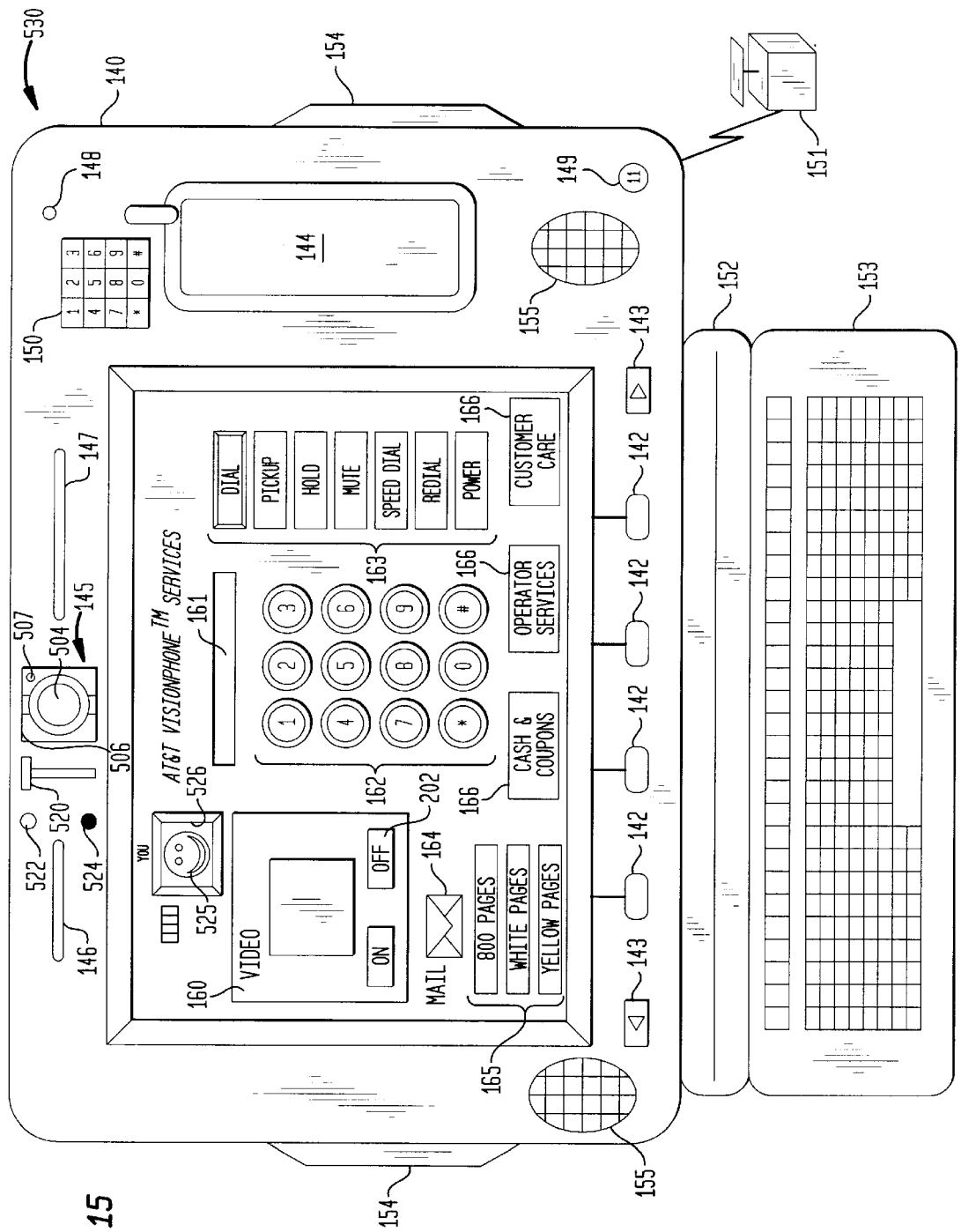
FIG. 15 illustrates a videophone similar to that depicted in FIG. 3A and incorporating privacy features according to the invention, shown with the camera shutter open.
Figure 16:
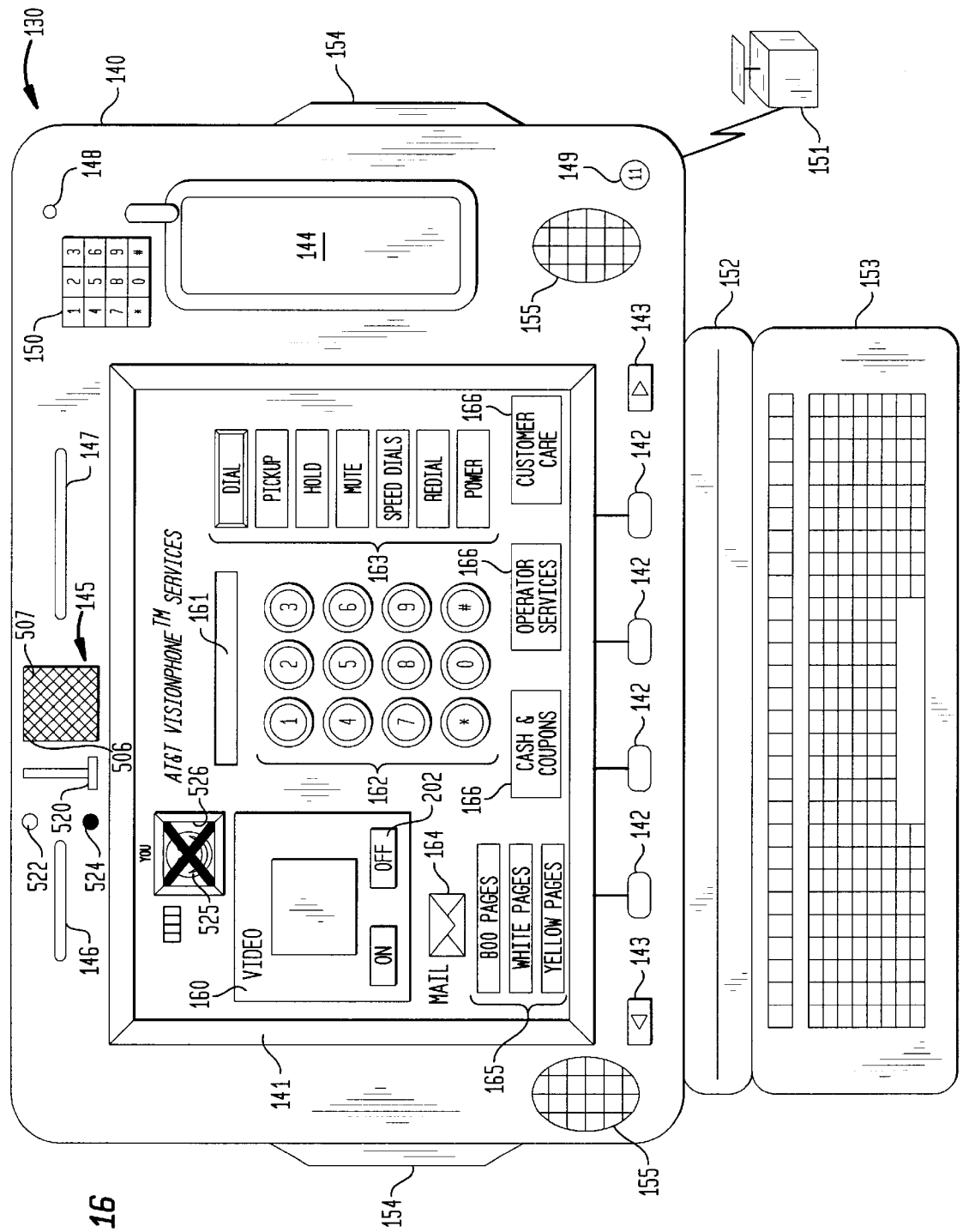
FIG. 16 is a similar view of the videophone of FIG. 15, shown with the camera shutter closed.

A stand-alone videophone, such as videophone 130 shown in FIG. 3A, may be equipped with the video privacy features of the invention, as shown in FIGS. 15 and 16. Videophone 530 may have all of the features of videophone 130, as well as the following. A shutter 510 selectively covers (FIG. 16) or uncovers (FIG. 15) the square camera window 506, through which camera lens 504 gathers light to register and transmit an image to the remote caller. A video indicator 507 (such as a red LED) adjacent lens 504 also is covered when shutter 510 is closed.

The shutter is moved between its open and closed positions by a manual lever 520 coupled to the shutter through any suitable mechanical linkage. The top position 522 of lever 520 is the open position (O), while the bottom position 524 is the closed position (●). Instead of a lever-actuated linkage, a push-button-activated servomotor could be used to actuate shutter 510, as in set-top camera 400. Although a curtain-type shutter is shown, any type of shutter may be employed to selectively open and close camera window 506. Shutter 510 also could be remotely actuated by a servomotor from handset 144, in the same manner described in regard to set-top camera 400.

Videophone 530 functions in essentially the same manner as set-top camera 400 to afford the local caller selective and assured visual privacy during a telephone call. An added feature is a visual signal in the form of a facial icon 525 in "YOU" window 526. When shutter 510 is open, a full icon appears, as seen in FIG. 15. When the shutter is closed, an "X" covers icon 525 to indicate that the camera is shuttered (FIG. 16). Separate and apart from the feedback afforded by actually seeing shutter 510 in its closed position, this signal gives the local caller an added measure of confidence that his visual privacy is assured. The icon 525 and the "X" displayed in window 526 preferably appear on a liquid crystal display. Icon 525 preferably appears in window 526 throughout the duration of a call, and is not displayed when no call is in progress.

The following applications, filed concurrently herewith, are hereby incorporated by reference:

1. A Hybrid Fiber Twisted-pair Local Loop Network Service Architecture (Ser. No. 09/001,360);
2. Dynamic Bandwidth Allocation for use in the Hybrid Fiber Twisted-pair Local Loop Network Service Architecture (Ser. No. 09/001,425);
3. The VideoPhone (Ser. No. 09/001,905);
4. VideoPhone Privacy Activator (Ser. No. 09/001,909);
5. VideoPhone Form Factor (Ser. No. 09/001,583);
6. VideoPhone Centrally Controlled User Interface With User Selectable Options (Ser. No. 09/001,576);
7. VideoPhone User Interface Having Multiple Menu Hierarchies (Ser. No. 09/001,908);
8. VideoPhone Blocker (Ser. No. 09/001,353);
9. VideoPhone Inter-com For Extension Phones (Ser. No. 09/001,358);
10. The Advertising Screen Saver (Ser. No. 09/001,574);
11. Information Display for Visual Communication Device (Ser. No. 09/001,906);
12. VideoPhone Multimedia Announcement Answering Machine (Ser. No. 09/001,911)
13. VideoPhone Multimedia Announcement Message Toolkit (Ser. No. 09/001,345);
14. VideoPhone Multimedia Video Message Reception (Ser. No. 09/001,362);
15. VideoPhone Multimedia Interactive Corporate Menu Answering Machine Announcement (Ser. No. 09/001,575);
16. VideoPhone Multimedia Interactive On-Hold Information Menus (Ser. No. 09/001,356);
17. VideoPhone Advertisement When Calling Video Non-enabled VideoPhone Users (Ser. No. 09/001,361);
18. Motion Detection Advertising (Ser. No. 09/001,355);
19. Interactive Commercials (Ser. No. 09/001,578);
20. VideoPhone Electronic Catalogue Service (Ser. No. 09/001,421);
21. A Multifunction Interface Facility Connecting Wideband Multiple Access Subscriber Loops With Various Networks (Ser. No. 09/001,356);
23. Life Line Support for Multiple Service Access on Single Twisted-pair (Ser. No. 09/001,343);
24. A Network Server Platform (NSP) For a Hybrid Fiber Twisted-pair (HFTP) Local Loop Network Service Architecture (Ser. No. 09/001,582);
25. A Communication Server Apparatus For Interactive Commercial Service (Ser. No. 09/001,344);
26. NSP Based Multicast Digital Program Delivery Services (Ser. No. 09/001,580);
27. NSP Internet, JAVA Server and VideoPhone Application Server (Ser. No. 09/001,354);
28. NSP WAN Interconnectivity Services for Corporate Telecommuting (Ser. No. 09/001,540);
29. NSP Telephone Directory White-Yellow Page Services (Ser. No. 09/001,426);
30. NSP Integrated Billing System For NSP services and Telephone services (Ser. No. 09/001,359);
31. Network Server Platform/Facility Management Platform Caching Server (Ser. No. 09/001,419);
32. An Integrated Services Director (ISD) Overall Architecture (Ser. No. 09/001,417);

33. ISD/VideoPhone (Customer Premises) Local House Network (Ser. No. 09/001,418);
34. ISD Wireless Network (Ser. No. 09/001,363);
35. ISD Controlled Set-Top Box (Ser. No. 09/001,424);
36. Integrated Remote Control and Phone (Ser. No. 09/001,423);
37. Integrated Remote Control and Phone User Interface (Ser. No. 09/001,420);
38. Integrated Remote Control and Phone Form Factor (Ser. No. 09/001,910);
39. VideoPhone Mail Machine (Attorney Docket No. 3493.73170);
40. Restaurant Ordering Via VideoPhone (Attorney Docket No. 3493.73171);
41. Ticket Ordering Via VideoPhone (Attorney Docket No. 3493.73712);
42. Multi-Channel Parallel/Serial Concatenated Convolutional Codes And Trellis Coded Modulation Encode/Decoder (Ser. No. 09/001,342);
43. Spread Spectrum Bit Allocation Algorithm (Ser. No. 09/001,842);
44. Digital Channelizer With Arbitrary Output Frequency (Ser. No. 09/001,581);
45. Method And Apparatus For Allocating Data Via Discrete Multiple Tones (Ser. No. 08/997,167);
46. Method And Apparatus For Reducing Near-End Cross Talk In Discrete Multi-Tone Modulators/Demodulators (Ser. No. 08/997,176).

The present application is number 8 on the above list.

In addition, the following two patent applications are hereby incorporated by reference:

1. U.S. patent application Ser. No. 08/943,312 filed Oct. 14, 1997, entitled Wideband Communication System for the Home, to Robert R. Miller, II and Jesse E. Russell, and
2. U.S. patent application Ser. No. 08/858,170, filed May 14, 1997, entitled Wide Band Transmission Through Wire, to Robert R. Miller, II, Jesse E. Russell and Richard R. Shively.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. In a videophone having a camera for producing a video signal representative of the local image encompassed by the camera lens, a shutter in front of the lens, and an actuator for moving the shutter to selectively cover or uncover the lens at the option of the local caller, the improvement comprising a video indicator which separately indicates that the shutter is open, said video indicator being located adjacent the lens in an area that is covered by the shutter when the shutter is closed, so that said video indicator is visible when the shutter is open, and is covered when the shutter is closed.

2. A videophone according to claim 1 further comprising a visual signal which is displayed when the shutter is closed.

3. A videophone according to claim 2 wherein said visual signal comprises an icon.

4. A videophone according to claim 1 wherein said video indicator is an LED.

5. A videophone according to claim 1 wherein the camera is adapted for placement adjacent a video receiver on which an image from the remote caller is displayed.

6. A videophone according to claim 5 wherein said actuator comprises a cordless remote control operatively linked to the camera.

7. A videophone according to claim 1 wherein said actuator comprises a manually engageable shutter control.

8. A videophone according to claim 7 wherein said manually engageable shutter control is located adjacent the camera.

9. A videophone according to claim 8 wherein said video indicator comprises a visual signal which is displayed when the shutter is closed.

10. A videophone according to claim 9 wherein said visual signal comprises an icon.

* * * * *